Dec. 4, 1928.

D. T. SIMONDS 1,694,237

CONTROL SYSTEM

Filed Feb. 6, 1926

Inventor:
Dewey T. Simonds,
by
His Attorney.

Patented Dec. 4, 1928.

1,694,237

UNITED STATES PATENT OFFICE.

DEWEY T. SIMONDS, OF SCHENECTADY, NEW YORK, ASSIGNOR TO GENERAL ELECTRIC COMPANY, A CORPORATION OF NEW YORK.

CONTROL SYSTEM.

Application filed February 6, 1926. Serial No. 86,677.

My invention relates to systems for controlling the movement of air or marine vessels, and has for its principal object the provision of an improved system for automatically steering such a vessel over a predetermined course.

Various arrangements have been proposed in the past for automatically steering a vessel. Many of these arrangements comprise mechanical devices or parts that are either likely to produce hunting or are not reliable and sensitive in their operation. In accordance with my invention, the operation of the vessel's steering mechanism is effected through means comprising a control circuit provided with a current regulating device which has no mechanical contacts and is operated by the earth's magnetic field and with a device operated by movement of the steering mechanism to produce in the control circuit an electromotive force whereby hunting or overtravel of the mechanism is avoided.

My invention will be better understood from the following description when considered in connection with the accompanying drawings and its scope will be pointed out in the appended claims.

Figure 1:
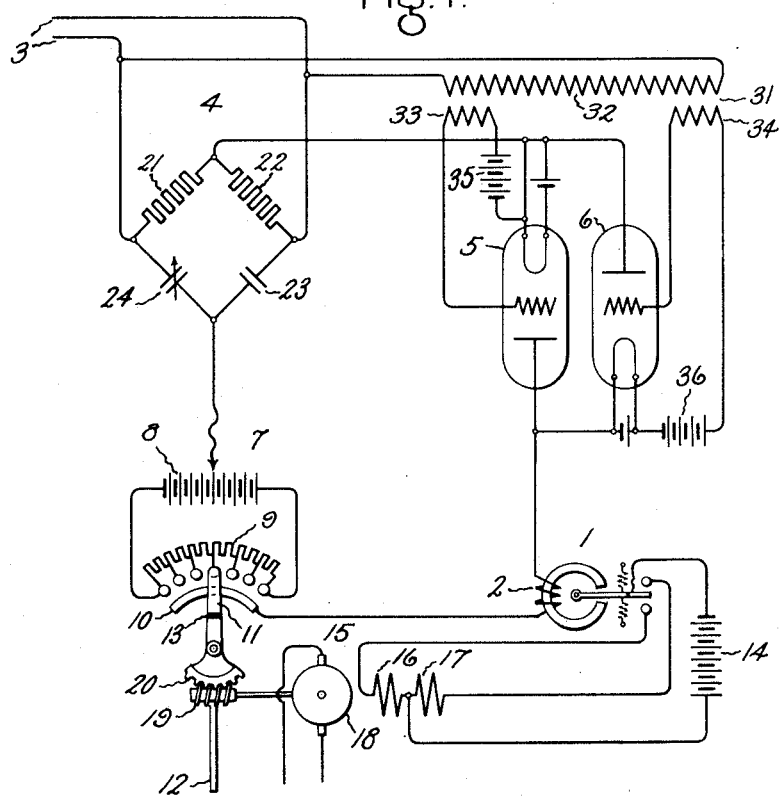
Figure 2:
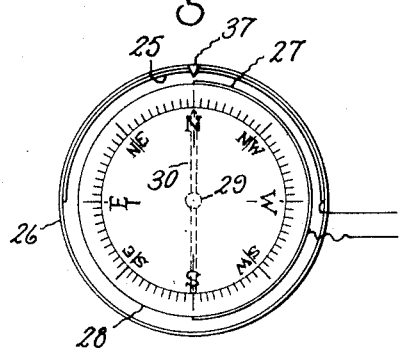

Referring to the drawings, Fig. 1 shows a steering system wherein my invention has been embodied; and Fig. 2 shows an impedance device adapted to be operated by the earth's magnetic field.

Fig. 1 shows a polarized relay 1 provided with an operating coil 2 which is interconnected with alternating current supply means, shown as leads 3, through a control circuit comprising a current regulating device 4, a pair of reversely connected thermionic devices 5 and 6 and an antihunting device comprising current supply means such as a battery 8 and an adjustable impedance device 9. The device 9 comprises a stationary contact 10 and a contact 11 which is moved in accordance with the movement of the vessel's rudder 12 and is insulated from this rudder and its operating mechanism by means shown as an insulation segment 13. Current supply means 14 and a motor 15 comprising oppositely wound field coils 16 and 17 and an armature 18 are controlled by the polarized relay 1 for operating the rudder 12 through means shown as a worm 19 and gear 20.

The current regulating device 4 is shown as a balanced bridge apparatus comprising resistors 21 and 22, a fixed impedance element 23 and an impedance element 24 arranged to be operated by the earth's magnetic field. As indicated by Fig. 2 the element 24 may be an electrical condenser provided with a stationary semi-cylindrical plate 25 mounted on an adjustable insulation support 26 and with a movable semi-cylindrical plate 27 mounted on an insulation support 28 fixed to a rotatable shaft 29 to which is attached a compass 30. The resistors 21 and 22 and the elements 23 and 24 are so related that no current is supplied to the control circuit when the condenser 24 is adjusted to half its maximum capacity. It will be apparent that any other suitable means operated by the earth's magnetic field may be utilized to regulate the current of the control circuit in a manner to maintain a predetermined course of the vessel.

The electronic devices 5 and 6 are provided for rectifying the current supplied to the relay coil 2 through the current control or balanced bridge device 4 from the line 3. These devices do not operate simultaneously for the reason that they are oppositely connected in the control circuit. A transformer 31 comprising a primary winding 32 and secondary windings 33 and 34 is connected between the alternating circuit 3 and the grid circuits of electronic devices 5 and 6, bias means shown as batteries 35 and 36 being provided for keeping the grid potentials low enough to render the devices non-productive except during the positive half cycle of the grid potential.

The course to be followed by the vessel is predetermined by adjustment of the insulation member 26 to which the plate 25 of the condenser 24 is fixed. An indicator 37 is attached to the member 26 for changing the course of the ship.

When the vessel is sailing due north and the indicator 37 is in its illustrated position, the current control device 4 is balanced, the control circuit is connected to equipotential points and the movable contact of the relay 1 is maintained in its illustrated open position due to the fact that no current is supplied to the operating coil 2. If it is desired to change the course of the vessel from north to northeast, the indicatior 37 is adjusted to the "NE" position. Under these conditions the current control device 4 is unbalanced, the relay coil is supplied with current through thermionic device 5 and anti-hunting device 7, the movable contact of relay 1 is operated to one of its closed positions and the rudder 12 is rotated in a counter-clockwise direction by the motor 15, thus tending to change the course of the ship to the northeast. Upon movement of the rudder, the contact member 11 is moved from its central position and a counter-electromotive force is applied to the control circuit by the battery 8. Due to this counter-electromotive force the relay operating coil 2 is deenergized at an instant of time preceding balancing of the device 4 and overtravel of the control motor 15 is prevented. The vessel thus approaches its new course asymptotically and cannot oscillate about it.

If the indicator 37 is adjusted to the northwest position when the vessel is sailing north, the potential applied to the control circuit through the current control device 4 is reversed with respect to that applied to this circuit when the indicator is moved from the "N" to the "NE" position and control current is transmitted through the thermionic device 6 instead of device 5. The operation of the system to change the course of the vessel to any desired point of the compass will be readily understood without further explanation.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:—

1. The combination of a steering apparatus, and a control circuit comprising a balanced bridge device controlled by the earth's magnetic field to regulate the current of said circuit, and means operated in response to movement of said apparatus for producing in said circuit an electromotive force whereby overtravel of said steering device is prevented.

2. The combination of a steering apparatus, and a circuit for controlling the operation of said apparatus comprising means operated by the earth's magnetic field for regulating the current of said circuit, a polarized relay operated by said current, and means operated in response to movement of said apparatus for producing in said control circuit an electromotive force whereby overtravel of said steering device is prevented.

3. The combination of a steering apparatus, a circuit for controlling the operation of said apparatus, a bridge device comprising an adjustable condenser connected in said control circuit for regulating its current, and means controlled by the earth's magnetic field for adjusting said condenser.

4. The combination of a steering apparatus, a circuit for controlling the operation of said apparatus, a bridge device comprising an electrical condenser provided with movable and stationary members connected in said circuit, means coupled to said movable member and controlled by the earth's magnetic field for regulating the current of said circuit, and an adjustable support for said stationary member.

5. The combination of a steering apparatus, a circuit for controlling the operation of said apparatus, a bridge device comprising an electrical condenser provided with movable and stationary members connected in said circuit, means coupled to said movable member and controlled by the earth's magnetic field for regulating the current of said circuit, an adjustable support for said stationary member, and means operated in response to movement of said apparatus for applying to said circuit an electromotive force whereby overtravel of said apparatus is prevented.

In witness whereof, I have hereunto set my hand this 5th day of February, 1926.

DEWEY T. SIMONDS.